United States Patent
Cashman et al.

(10) Patent No.: US 11,954,801 B2
(45) Date of Patent: Apr. 9, 2024

(54) CONCURRENT HUMAN POSE ESTIMATES FOR VIRTUAL REPRESENTATION

(71) Applicant: Microsoft Technology Licensing, LLC, Redmond, WA (US)

(72) Inventors: Thomas Joseph Cashman, Cambridge (GB); Erroll William Wood, Cambridge (GB); Federica Bogo, Zurich (CH); Sasa Galic, Belgrade (RS); Pashmina Jonathan Cameron, Cambridge (GB)

(73) Assignee: Microsoft Technology Licensing, LLC, Redmond, WA (US)

(*) Notice: Subject to any disclaimer, the term of this patent is extended or adjusted under 35 U.S.C. 154(b) by 81 days.

(21) Appl. No.: 17/658,809

(22) Filed: Apr. 11, 2022

(65) Prior Publication Data

US 2023/0326135 A1    Oct. 12, 2023

(51) Int. Cl.
| | |
|---|---|
| G06T 11/00 | (2006.01) |
| G06F 3/01 | (2006.01) |
| G06T 7/73 | (2017.01) |
| G06T 17/20 | (2006.01) |

(52) U.S. Cl.
CPC .............. *G06T 17/20* (2013.01); *G06F 3/011* (2013.01); *G06F 3/017* (2013.01); *G06T 7/75* (2017.01); *G06T 2207/20081* (2013.01)

(58) Field of Classification Search
CPC . G06T 17/20; G06T 7/75; G06T 2207/20081; G06F 3/011; G06F 3/017
See application file for complete search history.

(56) References Cited

U.S. PATENT DOCUMENTS

| 9,317,741 B2 | 4/2016 | Guigues et al. |
| 10,529,137 B1 | 1/2020 | Black et al. |
| 11,017,577 B2 | 5/2021 | Black et al. |
| 11,074,711 B1 * | 7/2021 | Akbas ............... G06V 10/454 |
| 2010/0238182 A1 | 9/2010 | Geisner et al. |

(Continued)

OTHER PUBLICATIONS

Lombardi, et al., "LatentHuman: Shape-and-Pose Disentangled Latent Representation for Human Bodies", In Repository of arXiv:2111.15113v1, Nov. 30, 2021, 11 Pages.

(Continued)

*Primary Examiner* — Terrell M Robinson
(74) *Attorney, Agent, or Firm* — Alleman Hall & Tuttle LLP

(57) ABSTRACT

A method for virtually representing human body poses includes receiving positioning data detailing parameters of one or more body parts of a human user based at least in part on input from one or more sensors. One or more mapping constraints are maintained that relate a model articulated representation to a target articulated representation. A model pose of the model articulated representation and a target pose of the target articulated representation are concurrently estimated based at least in part on the positioning data and the one or more mapping constraints. The previously-trained pose optimization machine is trained with training positioning data having ground truth labels for the model articulated representation. The target articulated representation is output for display with the target pose as a virtual representation of the human user.

18 Claims, 6 Drawing Sheets

(56) References Cited

U.S. PATENT DOCUMENTS

| | | | |
|---|---|---|---|
| 2010/0303303 A1* | 12/2010 | Shen | G06V 40/20 |
| | | | 382/107 |
| 2013/0266182 A1* | 10/2013 | Shotton | G06V 40/20 |
| | | | 382/103 |
| 2016/0086349 A1 | 3/2016 | Shotton et al. | |
| 2017/0316578 A1* | 11/2017 | Fua | G06T 7/246 |
| 2021/0035347 A1 | 2/2021 | Casas Guix et al. | |
| 2021/0150806 A1 | 5/2021 | Guler et al. | |
| 2022/0076472 A1 | 3/2022 | Bocquelet et al. | |

OTHER PUBLICATIONS

Loper, et al., "SMPL: A Skinned Multi-Person Linear Mode", In Journal of ACM Transactions on Graphics (TOG), vol. 34, Issue 6, Nov. 2, 2015, 16 Pages.

Madaras, et al., "Skeleton-Based Matching for Animation Transfer and Joint Detection", In Proceedings of the 30th Spring Conference on Computer Graphics, May 28, 2014, pp. 91-98.

"International Search Report and Written Opinion Issued in PCT Application No. PCT/US2023/011583", dated May 9, 2023, 9 Pages.

* cited by examiner

200↴

```
┌─────────────────────────────────────────────────────┐
│  RECEIVE POSITIONING DATA DETAILING PARAMETERS FOR  │
│  ONE OR MORE BODY PARTS OF A HUMAN USER             │
│                                                 202 │
└─────────────────────────────────────────────────────┘
                          │
                          ▼
┌─────────────────────────────────────────────────────┐
│  MAINTAIN ONE OR MORE MAPPING CONSTRAINTS RELATING  │
│  A MODEL ARTICULATED REPRESENTATION TO A TARGET     │
│  ARTICULATED REPRESENTATION                         │
│                                                 204 │
└─────────────────────────────────────────────────────┘
                          │
                          ▼
┌─────────────────────────────────────────────────────┐
│  CONCURRENTLY ESTIMATE A MODEL POSE OF THE MODEL    │
│  ARTICULATED REPRESENTATION AND A TARGET POSE OF    │
│  THE TARGET ARTICULATED REPRESENTATION BASED AT     │
│  LEAST ON THE POSITIONING DATA AND THE ONE OR MORE  │
│  MAPPING CONSTRAINTS                                │
│                                                 206 │
└─────────────────────────────────────────────────────┘
                          │
                          ▼
┌─────────────────────────────────────────────────────┐
│  OUTPUT THE TARGET ARTICULATED REPRESENTATION WITH  │
│  THE TARGET POSE AS A VIRTUAL REPRESENTATION OF THE │
│  HUMAN USER FOR DISPLAY                             │
│                                                 208 │
└─────────────────────────────────────────────────────┘
```

FIG. 2

CONCURRENT HUMAN POSE ESTIMATES FOR VIRTUAL REPRESENTATION

BACKGROUND

Information regarding the "pose" of a human user (e.g., the positions of one or more of the user's body parts) may be mapped onto a virtual articulated representation that is rendered for display. For example, when the human user is participating in a virtual environment as part of a virtual reality experience, their representation within the virtual environment may be rendered with a pose that appears similar to the user's real-world pose. The user's real-world pose may be converted into the pose of a virtual articulated representation by a previously-trained model, such as a neural network, which can be trained to output poses for the same virtual articulated representation that is eventually rendered for display.

However, it may in some cases be desirable to display a representation of the human user that differs from the representation for which the model has training data labeled with ground truth labels. For example, different users may choose to be represented in the virtual environment with different virtual representations that have different proportions and/or a different number of joints from the training representation (e.g., users may be represented in a video game by different cartoonish characters having different body proportions, skeletons, and/or other aspects).

This scenario can be handled by using the model to first output a pose for the training representation, then transferring the pose to the display representation. However, this can result in a less accurate recreation of the user's real-world pose, and/or increase the computational burden required to output the pose, by requiring additional optimization steps to be performed for the display representation.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method for virtually representing human body poses includes receiving positioning data detailing parameters for one or more body parts of a human user based at least in part on input from one or more sensors. One or more mapping constraints are maintained that relate a model articulated representation to a target articulated representation. A model pose of the model articulated representation and a target pose of the target articulated representation are concurrently estimated based at least in part on the positioning data and the one or more mapping constraints. The previously-trained pose optimization machine is trained with training positioning data having ground truth labels for the model articulated representation. The target articulated representation is output for display with the target pose as a virtual representation of the human user.

BRIEF DESCRIPTION OF THE DRAWINGS

FIG. 2 illustrates an example method for virtually representing human body poses.

DETAILED DESCRIPTION

Figure 1:
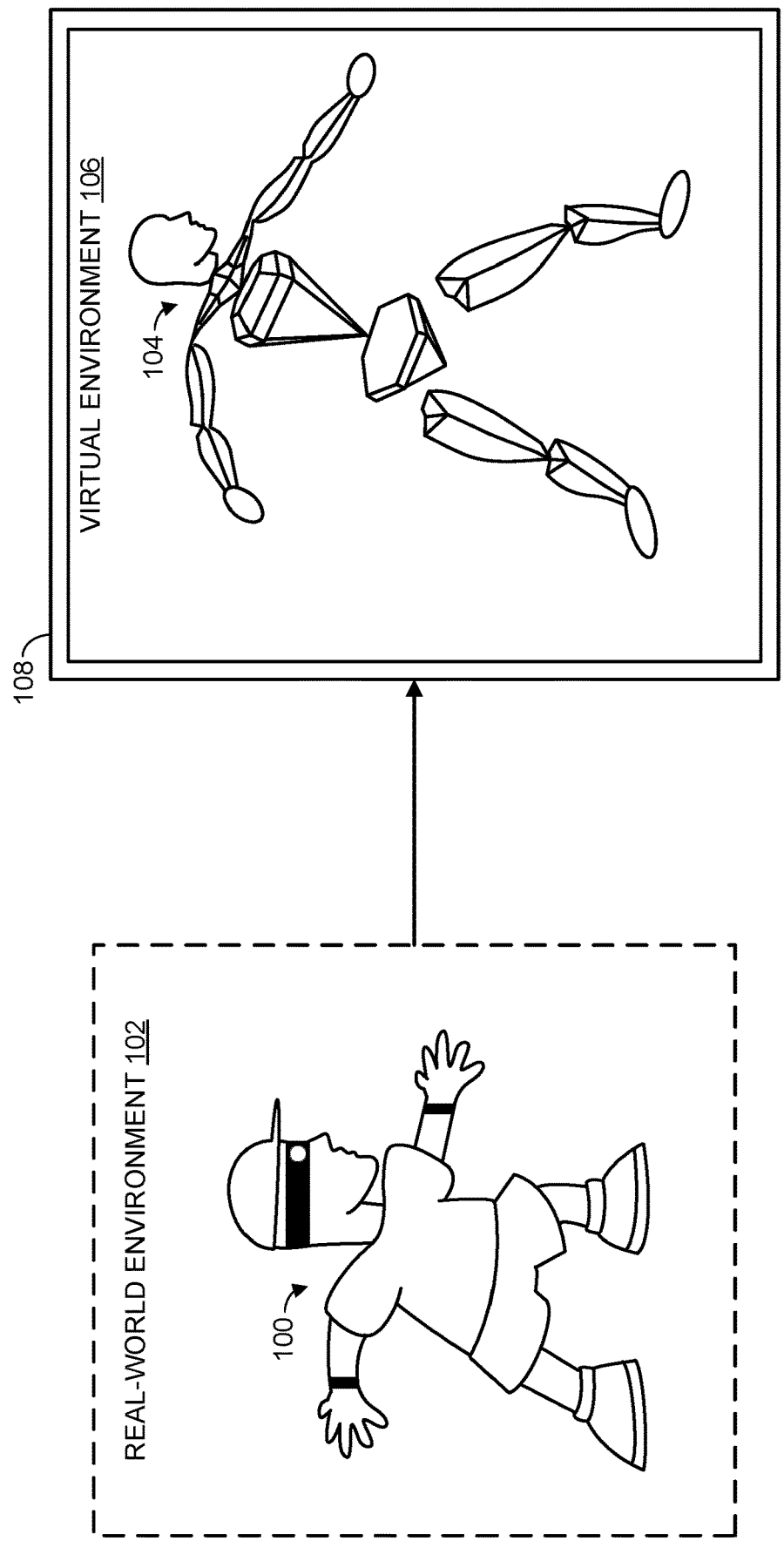
FIG. 1 schematically illustrates a human user virtually represented as an articulated representation in a virtual environment.

It is sometimes desirable to display a virtual articulated representation with a pose that appears similar to a human user's real-world pose. This is schematically illustrated with respect to FIG. 1, showing a human user 100 in a real-world environment 102. As shown, the pose of the human user is applied to an articulated representation 104 that virtually represents the human user in a virtual environment 106. In other words, as the human user moves parts of his body in the real-world environment, the user's movements are translated into corresponding movements of articulated representation 104 in virtual environment 106. For example, the articulated representation may be an avatar of human user 100 in a virtual reality video game, teleconference, and/or other virtual reality experience. By mapping the user's real-world movements to their virtual articulated representation, the immersion of the human user and any other participants in the virtual experience may be improved.

In FIG. 1, the articulated representation 104 and virtual environment 106 are presented on an electronic display device 108. The electronic display device may have any suitable form factor and utilize any suitable underlying display technology. For example, the electronic display device may be a near-eye display device (e.g., integrated into a head-mounted display), a television, computer monitor, smartphone, tablet, laptop display, projector system, etc. Notably, as will be described in more detail below, the articulated representation need not be presented by the same device that estimates the pose of the representation based on the real-world pose of the human user.

In some cases, the pose of the virtual articulated representation may be output by a previously-trained model, which may include a neural network as a non-limiting example. As discussed above, the model may in some cases be trained with training data having ground truth labels for the same virtual articulated representation that is displayed in the virtual environment. For instance, the training data may include positioning data for a human training subject's body parts (e.g., rotation parameters corresponding to the subject's joints), labeled with ground truth labels relating the positioning data to a pose of the corresponding joints of the virtual articulated representation that matches the subject's real-world pose. Based on such training data, the model may output poses for the virtual articulated representation for any suitable set of input positioning data.

However, in some cases, the virtual articulated representation that is displayed may differ from the representation used to train the model. To address this, a pose estimated for a trained articulated representation may be transferred to the displayed articulated representation, although this may result in a less accurate representation of the human user's real-world pose unless computational resources are spent on supplementary optimization steps. In another approach, a pose may be output directly for the displayed representation without the benefit of the labeled training data for the trained representation that constrains the pose to be likely, which can result in a less accurate recreation of the real-world pose of the human user.

Accordingly, the present disclosure is directed to techniques for concurrently estimating poses both for a model articulated representation (e.g., a representation for which a model is trained to output pose estimates), and a target articulated representation (e.g., an articulated representation to be displayed as a virtual representation of a human user). More particularly, according to the techniques described herein, a computing system receives positioning data detailing parameters for one or more body parts of a human user based at least in part on input from one or more sensors. This can include, for example, output from an inertial measurement unit (IMU) of a head-mounted display device (HMD) worn on the user's head, and/or output from a suitable camera (e.g., a camera of the HMD configured to image the user's hands). The system also maintains one or more mapping constraints relating the model articulated representation to the target articulated representation—e.g., a joint mapping constraint that specifies, for joints of the target articulated representation, one or more joints of the model articulated representation that map to the target joint. Based at least in part on the positioning data and the mapping constraint, a pose optimization machine concurrently estimates a model pose for the model articulated representation, and a target pose for the target articulated representation. Once estimated, the target articulated representation may be displayed with the target pose as a virtual representation of the human user.

The pose optimization machine may be trained with training positioning data having ground truth labels for the model articulated representation. However, in some cases, the training positioning data may lack ground truth labels for the target articulated representation. In this manner, the techniques herein may beneficially allow for accurate recreation of the human user's real-world pose, without requiring computationally expensive training for every different possible target articulated representation. For instance, while participating in a virtual environment, the user may be able to select from a wide range of different avatars used to represent them in the virtual environment, and the user may in some cases have the ability to change their appearance dynamically during a session—e.g., to change from one target articulated representation to another. New target articulated representations may be added to the menu of representations available to the user without the computational expense of retraining a model for that particular representation.

The techniques described herein may provide a technical benefit of reducing consumption of computing resources while accurately recreating a human user's real-world pose, and allowing the accurate pose to be applied to any of a plurality of different target articulated representations. This is done by concurrently estimating the target and model poses, whereas other approaches might perform additional pose transfer and optimization steps. Furthermore, the techniques herein are associated with specific mathematical operations that provide the technical purpose of concurrently estimating two different poses, corresponding to two different articulated representations, based on positioning data and mapping constraints.

FIG. 2 illustrates an example method 200 for virtually representing human body poses. Method 200 may be implemented by any suitable computing system of one or more computing devices. Any computing devices implementing method 200 may each have any suitable capabilities, form factors, and hardware configurations. In cases where two or more different devices implement steps of method 200, they may in some cases communicate over a suitable computer network—e.g., using a client/server model. Method 200 may in some cases be implemented by computing system 600 described below with respect to FIG. 6.

At 202, method 200 includes receiving positioning data detailing parameters for one or more body parts of a human user, based at least in part on input from one or more sensors. This is schematically illustrated with respect to FIG. 3, again showing human user 100. In some cases, the one or more body parts of the human user may include a head of the human user, such as head 300 of human user 100. In some examples, the one or more body parts of the human user may further include one or both hands of the human user, such as hands 302A and 302B of human user 100. In general, the system may derive positioning data for any or all different body parts of the human user (e.g., head, arms, hands, fingers, legs, feet).

As used herein, "positioning data" includes any suitable computer data that specifies, or is useable to estimate, the position, orientation, and/or movement of a body part of a human user in a real-world environment. For example, the positioning data may include, or be derived from, the output of one or more position sensors (such as an IMU), which may be integrated into one or more devices that are held by or worn on a corresponding body part of the human user. As another example, the positioning data may include, or be derived from, image or video data output by a suitable camera, configured to image portions of the real-world environment in which one or more body parts of the human user are visible.

As used herein, positioning data details "parameters" for the one or more body parts of the human user. This means that the positioning data includes information that specifies, or can be used to derive, the position, orientation, and/or movement of a human body part. For example, in a case where a human hand is visible in an image captured by a camera, the image data may in some cases be processed to estimate the position of the human hand relative to a real-world environment, and/or relative to the camera or another frame of reference. As such, in this case, the positioning data is derived from the output of the sensor (e.g., the camera), and the "parameter" detailed by the positioning data is the position estimate for the human hand.

As another example, however, "positioning data" may refer to the raw output of one or more sensors—e.g., a pose optimization machine may in some cases be trained to estimate a pose of a virtual articulated representation based on the raw sensor output. For instance, the pose optimization machine may receive image data from the camera as an input, and may be previously-trained to output a pose based at least in part on the image pixel data. Thus, the "parameters" detailed by the positioning data include the pixels depicting the human hand, which are useable to estimate the position of the hand.

Figure 3:
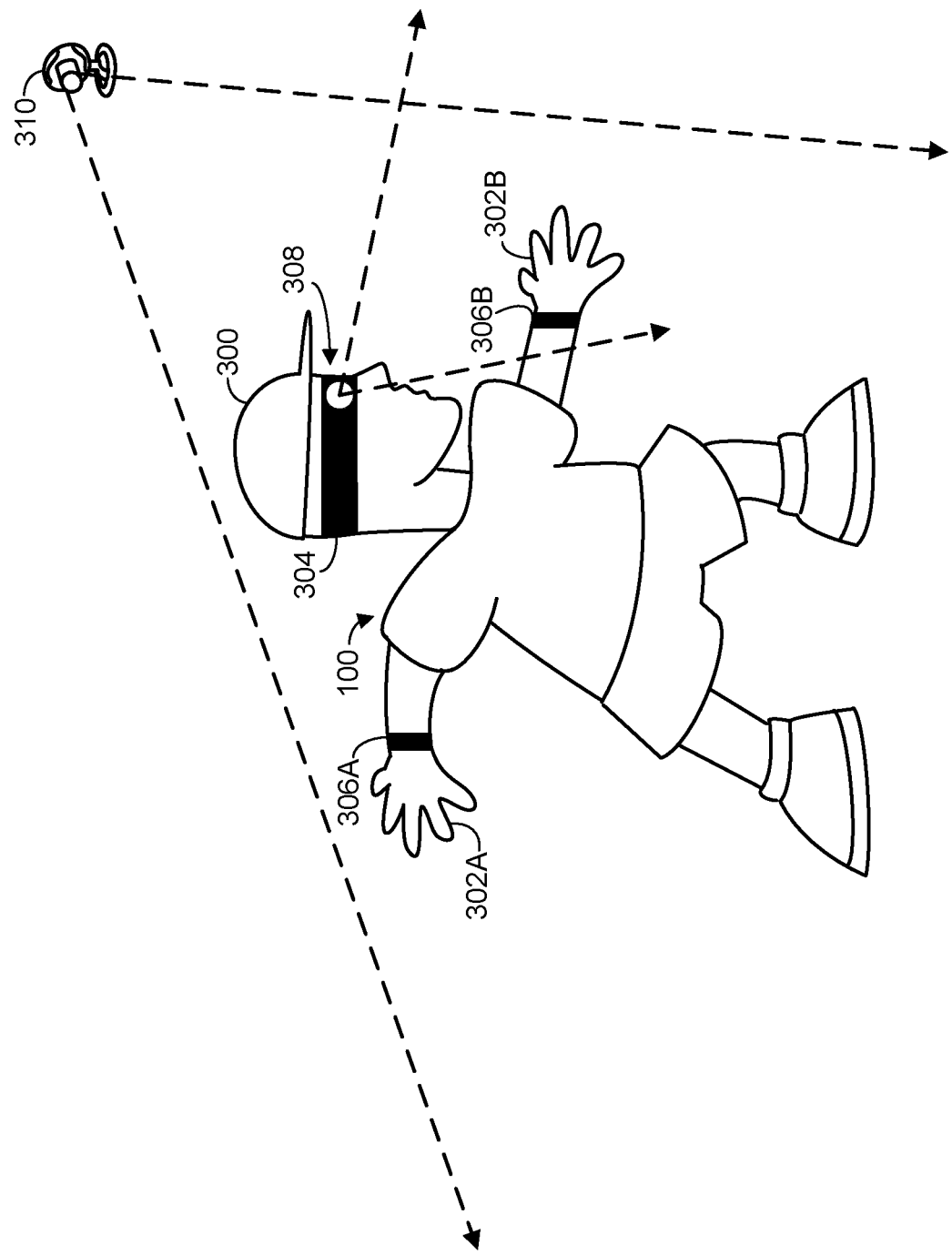
FIG. 3 schematically illustrates receiving positioning data for one or more body parts of a human user.

FIG. 3 schematically illustrates different types of sensors, where output from the sensors may include or be useable to derive the positioning data. Specifically, in FIG. 3, human user 100 is wearing a head-mounted display device (HMD) 304 on their head 300, where HMD 304 may be configured to perform one or more steps of method 200. The HMD may, for instance, include an IMU configured to detect changes in position and/or orientation of the HMD (e.g., via a suitable combination of accelerometers, gyroscopes, and/or magnetometers). As such, a change in the position/orientation detected by an IMU integrated into the HMD may be interpreted as a change in position/orientation of the user's head—e.g., positioning data for the head can be derived from the output of the HMD's integrated IMU.

Furthermore, in FIG. 3, human user 100 is wearing position sensors 306A and 306B, which may be configured to detect and report movements of the user's hands to HMD 304, and/or to another computing system configured to receive the positioning data. The wearable position sensors may, for example, include respective IMUs, and/or other suitable position sensors for detecting movements of the user's hands.

In some cases, positioning data may include or be derived from the output of hand-held position sensors in addition to or instead of wearable position sensors 306A and 306B. For example, the user may hold one or more handheld game controllers, each of which includes internal position sensors.

As another example, the positioning data may include or be derived from the output of a camera configured to image the one or more body parts of the human user. For example, in FIG. 3, HMD 304 includes an on-board camera 308, represented by a white circle. The arrows extending away from the white circle represent the field-of-view (FOV) of the camera within the real-world environment. As such, in the scenario depicted in FIG. 3, human hand 302B will be visible in images of the real-world environment captured by camera 308. The computing system may be configured to recognize pixels of the hand in the captured images (e.g., via a suitable machine-learning trained estimator configured to identify human hands in image data), and estimate a position of the hand based on the size and position of the hand within the captured image. Alternatively, as discussed above, output from the camera may be provided directly to a pose optimization machine configured to generate a pose for a virtual articulated representation.

It will be understood that, at any given time, either, both, or neither of the user's hands may be visible in the FOV of camera 308. Thus, the number of different body parts for which positioning data is received and used to output a pose for a virtual articulated representation may in some cases be variable over time—e.g., at some points, positioning data is received for both hands, and at other points, positioning data is received for neither hand.

Furthermore, in some cases, output from camera 308 may be useable to detect changes in the position and/or orientation of the camera, and thereby the head of the human user (in cases where the camera is integrated into an HMD worn on the user's head). For example, the computing system may recognize one or more landmarks in images of the real-world environment captured by camera 308. As the position and/or orientation of the camera changes, the image-space sizes and/or positions of the recognized landmarks will change. By detecting and analyzing such changes, the movements of the camera (and thereby the user's head) may be estimated.

In some cases, positioning data may be received from, and/or derived from the output of, one or more cameras in addition to, or instead of, a camera integrated into an HMD. For example, in FIG. 3, an external camera 310 is configured to image a portion of the real-world environment in which human user 100 is visible. The FOV of camera 310 is indicated by the dashed arrows extending away from the camera. Positions of any or all of the body parts of the human user (e.g., head 300, hands 306A/306B) may be detected in images captured by camera 310. Thus, the output of camera 310 may include positioning data for any or all body parts of the human user, and/or the output from the camera may be useable to derive the positioning data.

In some cases, either or both of cameras 308 and 310 may be implemented as depth cameras. For example, the camera(s) may be configured to emit patterns of structured light, or calculate the time-of-flight of a photon leaving a light emitter, reflecting off an object in the environment, and striking an image sensor of the camera. This may enable the camera(s) to more accurately detect the positions of the body parts of the human user relative to the camera and/or surrounding environment. The cameras may be sensitive to any suitable wavelengths of light—e.g., visible light and/or infrared light.

It will be understood that the specific sensors described above are non-limiting and need not all be used together. For example, one implementation may receive, or derive positioning data from, output from an IMU and camera integrated into an HMD, without using an external camera or any wearable/hand-held position sensors. Furthermore, it will be understood that positioning data may be received or derived from the output of one or more sensors not explicitly described herein. Rather, the present disclosure generally assumes that suitable positioning data is received, and is agnostic as to the specific origin and processing that may be applied to such positioning data.

Returning briefly to FIG. 2, at 204, method 200 includes maintaining one or more mapping constraints relating a model articulated representation to a target articulated representation. As discussed above, a "model" articulated representation refers to a representation for which a pose optimization machine has previously been trained with training data having ground truth labels. In this manner, when provided with a suitable set of positioning data at runtime, the pose optimization machine may output a pose for the model articulated representation that resembles the real-world pose of the human user to which the positioning data refers. The model articulated representation is related by one or more mapping constraints to a "target" articulated representation, which is intended for display as part of a virtual experience.

Figure 4:
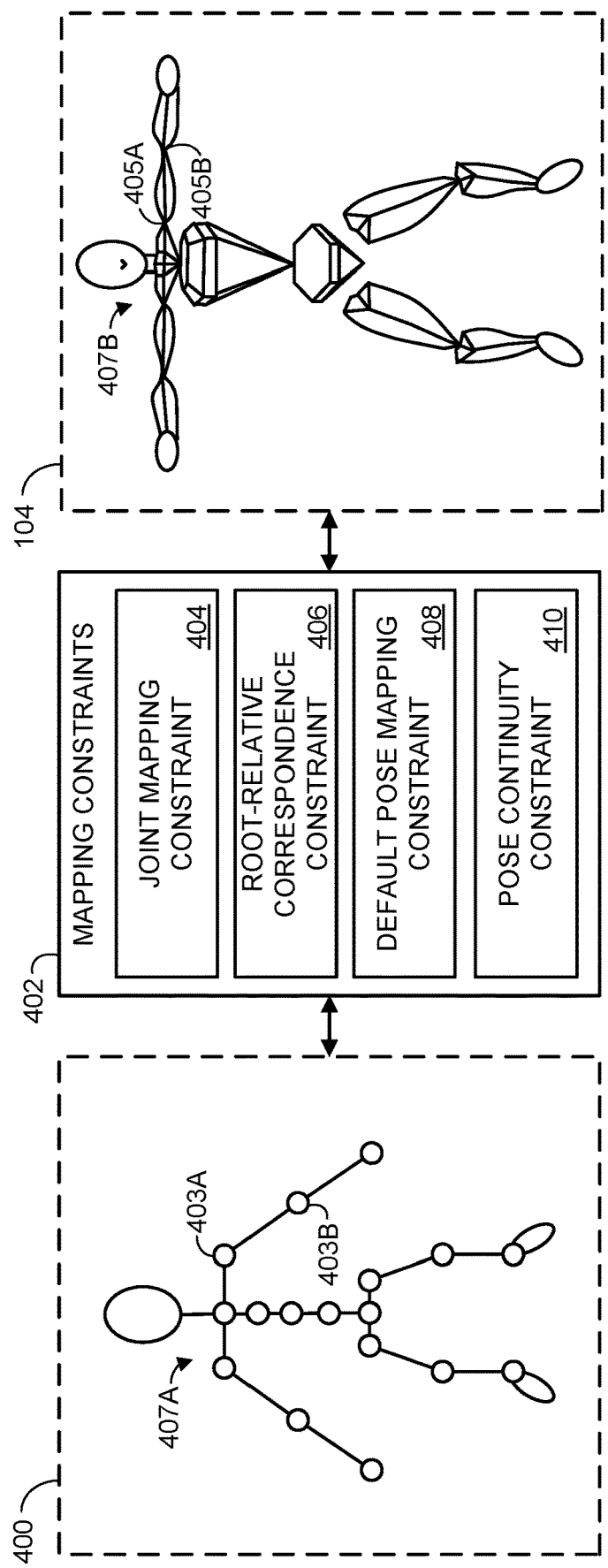
FIG. 4 schematically illustrates maintaining one or more mapping constraints relating a model articulated representation to a target articulated representation.

This is schematically illustrated with respect to FIG. 4, which shows an example model articulated representation 400. It will be understood that model articulated representation 400 is highly simplified and provided only for the sake of illustration. In general, the model articulated representation will take the form of a digital representation of a human body, in which different parts of the representation are coupled via a plurality of joints. However, the proportions of the representation, as well as the specific number of limbs, joints, and other moveable body parts may vary depending on the implementation. As one non-limiting example, the model articulated representation may be implemented as the SMPL (Skinned Multi-Person Linear Model) representation.

In the example of FIG. 4, the target articulated representation is representation 104, also shown in FIG. 1. As discussed above, the target articulated representation is rendered for display in a virtual environment, and may be displayed with a target pose output by a pose optimization machine. It will be understood, however, that target articulated representation 104 is a non-limiting example, and that the techniques described herein may be applied to any of a wide variety of different suitable representations of a human user.

For instance, the target articulated representation may have any suitable appearance and proportions, and may have any suitable number of limbs, joints, and/or other moveable body parts. While the target articulated representation may typically be humanoid in appearance (e.g., as it represents a real-world human user), this need not always be the case—e.g., the target articulated representation may resemble a non-human animal, fictional character, or virtually any other suitable avatar having multiple moveable body parts. Furthermore, the target articulated representation may differ from the model articulated representation in any number of different ways. For example, the model articulated representation may have a different number of joints from the target articulated representation, a different number of limbs (and/or other moveable body parts), different proportions, a different appearance, etc.

The model articulated representation and the target articulated representation are related by one or more mapping constraints 402. As will be described in more detail below, a pose optimization machine concurrently estimates poses both for the model and target articulated representations, by finding poses that are consistent with the positioning data and also satisfy the mapping constraints. Thus, a "mapping constraint" may take the form of any suitable function or relationship that affects the range of possible poses of the target articulated representation based on some property of the model articulated representation.

As one non-limiting example, the one or more mapping constraints may include a joint mapping constraint 404. The joint mapping constraint specifies, for a joint of the target articulated representation, a set of one or more joints in the model articulated representation that map to the joint of the target articulated representation. For example, model articulated representation 400 includes a plurality of joints, two of which are labeled as 403A and 403B, which correspond to the shoulder and elbow joints. Target articulated representation 104 includes similar joints 405A and 405B. Thus, the plurality of mapping constraints may include different joint mapping constraints for joints 405A and 405B of the target representation, indicating that such joints map to joints 403A and 403B of the model representation.

In the above example, there is a one-to-one correspondence between joints in the target articulated representation and joints in the model articulated representation. It will be understood, however, that this need not always be the case. Rather, in some examples, two or more different joints in the model articulated representation may map to a single joint in the target articulated representation. For example, the target articulated representation may include fewer spinal joints than the model articulated representation. Thus, a joint mapping constraint may specify that two or more different spinal joints in the model representation influence one spinal joint in the target representation.

In some cases, the joint mapping constraint may further specify weights for each of the joints in the model articulated representation that map to the joint of the target articulated representation. For instance, when only one joint in the model articulated representation maps to a particular joint of the target articulated representation, the model joint may have a weight of 100%. When two model joints map to the target joint, the two model joints may have weights of 50% and 50%, 30% and 70%, 10% and 90%, etc. It will be understood that a joint in the target articulated representation may map to any number of different joints in the model articulated representation, and each of such joints may have any suitable weights.

To describe joint mapping constraints mathematically, let the model articulated representation include a set of joints $\mathbb{J}_{src}$, and the target articulated representation include a set of joints $\mathbb{J}_{dst}$. The $i^{th}$ joint of the model articulated representation is $j_{src}{}^i$, and all $j_{src} \in \mathbb{J}_{src}$. The $k^{th}$ joint of the target articulated representation is $j_{dst}{}^k$, and all $j_{dst} \in \mathbb{J}_{dst}$. A joint mapping constraint may be described as a mapping from joint $j_{dst}{}^k$ in the destination rig $\mathbb{J}_{dst}$ hist to an ordered list of joints $j_{src}{}^i$ in the source rig $\mathbb{J}_{src}$, each with scalar weight $\alpha_i$:

$$M_{dst \to src}(j_{dst}): j_{dst}{}^k \in \mathbb{J}_{dst} \to [(j_{src}{}^1, \alpha_1), (j_{src}{}^2, \alpha_2), \ldots$$
$$(j_{src}{}^N, \alpha_s)] \text{ where } j_{src}{}^i \in \mathbb{J}_{src}.$$

As another example, the one or more mapping constraints may include a root-relative correspondence constraint 406. The root-relative correspondence constraint may specify that a rotation applied to a model joint of the model articulated representation relative to a root of the model articulated representation in the model pose has at least a threshold similarity to a rotation of a corresponding target joint of the target articulated representation relative to a root of the target articulated representation in the target pose.

In some cases, the pose of an articulated representation may be expressed as the rotations of a plurality of joints of the representation expressed in a joint-local format, referring to a rotation of the joint relative to the joint's local coordinate system. By contrast, a "rig-space" rotation may be defined by the rotation and translation of various joints relative to a root of the articulated representation. The root of the articulated representation stores the global position of the articulated representation. In the specific example of the SMPL representation $\mathbb{J}_{src}$, the pelvis joint ($j_{src}{}^0 = j_{src}{}^{PELVIS}$) is the root. In many cases, the target articulated representation will also use the pelvis joint as a root, although this need not always be the case. When the root for the target articulated representation defines its root at a different joint from the model articulated representation, a re-rooting process may be applied to traverse the kinematic tree of the target articulated representation. This may be done to derive an alternate version of the target articulated representation that uses the same root as the model articulated representation.

In any case, the root-relative correspondence constraint may contribute to the model and target poses output for the model and target articulated representations appearing to be substantially similar. For example, when the model articulated representation has a pose in which the hands are positioned in front of the representation's head (e.g., covering a face of the representation), this pose may be expressed as rotations of a plurality of joints of the model representation relative to the root of the model representation (e.g., the pelvis). When similar rotations are applied to corresponding joints of the target articulated representation relative to the root of the target representation, a substantially similar pose may be achieved. The root-relative rotation for a given joint may be referred to as the local rotation, or "local theta" when the rotations are represented using an axis-angle (e.g., yaw, pitch, roll) convention. Thus, a local rotation for a non-root joint can be expressed as $j_{src}{}^i \in \mathbb{J}_{src} \mid i \neq 0$, where $j_{src}{}^0$ is the root joint.

As such, the root-relative correspondence constraint may specify that the local rotation applied to any given joint in the target articulated representation should have at least a threshold similarity to the local rotations applied to one or more joints in the model articulated representation that map to the target joint. In cases where two or more model joints map to the target joint, a weighted average of the local rotations may be used. The root-relative correspondence constraint may specify any suitable threshold—e.g., a 10% threshold may be used. Notably, in some cases it may not be desirable for the exact same local rotations to be applied to corresponding joints in the model and target representations—e.g., such as cases where differing proportions or limb lengths between the two representations would cause unrealistic or unnatural poses (such as two hands intersecting one another).

As another example, the one or more mapping constraints may include a default pose mapping constraint, specifying one or more rotations to be applied to one or more joints of the target articulated representation to match a default pose of the model articulated representation. This may be used in cases where the model and target articulated representations have different default poses, also referred to as "bind" poses or "resting" poses. In this example of FIG. 4, model articulated representation 400 is shown in a default pose 407A that is sometimes referred to as an "A-pose," where the arms of the representation are angled downward, and the hands have a similar height to the pelvis. By contrast, target articulated representation 104 is shown in a default pose 407B referred to as a "T-pose," where the arms extend perpendicular to the torso. It will be understood that these default poses are non-limiting examples, and that each of the model and target articulated representations may use any suitable default poses.

The default pose mapping constraint may be expressed mathematically as a function that applies, for the target articulated representation starting in its default pose, a rotation $R_i$ to each joint $j_{src}^i \in \mathbb{J}_{dst}$ in joint-local space. In this manner, the new pose of the target articulated representation may be substantially similar to the default pose of the model articulated representation. This may be referred to as the adjusted bind pose of the target articulated representation.

$$P_{bnd \to adjBnd}^{dst}(j_{dst}): j_{dst} \in \mathbb{J}_{dst} \to R \in \mathbb{R}^{3 \times 3}$$

As another example, the one or more mapping constraints may include a pose continuity constraint, specifying a frame-to-frame change limit for one or more joints of the model articulated representation and one or more joints of the target articulated representation. Notably, as will be described in more detail below, the model pose and target pose for the model and target articulated representations may in some cases be estimated based at least in part on one or more preceding model poses and preceding target poses estimated on one or more preceding time frames. Thus, the pose continuity constraint may limit the extent to which the state of a joint (e.g., the local rotation of the joint) can change from one time frame to another.

The specific frame-to-frame change limit used may vary from one implementation to another, and will typically depend on the framerate at which new poses are estimated. Any suitable framerate may be used—as non-limiting examples, poses may be estimated at a rate of 30 frames-per-second (FPS) or 60 FPS. Similarly, the frame-to-frame change limit may, as one example, specify that the local rotation of a joint should not change by more than 10° from one frame to another.

It will be understood that the specific mapping constraints described above are non-limiting examples. In general, the set of mapping constraints used in estimating model and target poses need not include each of the constraints described above, and may in some cases include one or more mapping constraints in addition to those described above. Rather, a "mapping constraint" may take the form of any suitable function or relationship that affects the range of possible poses of the target articulated representation based on some property of the model articulated representation.

In view of the above mapping constraints, a non-limiting example algorithm is provided that is useable to apply a given pose to a target articulated representation, beginning in its default pose. Specifically, a mapping from joint-local space to rig-space for the target articulated representation in the adjusted bind pose can be determined: $Q_{jntLocal \to rig}(x)$: $x_j \in \mathbb{J}_{dst} \to R$. For simplicity, $x_j^{dst}$ is denoted as $j_{dst}$, and $y_i^{src}$ is denoted as $j_{src}$.

for $j_{dst}$ in $\mathbb{J}_{dst}$:

$R'_{src} = \vec{0}$
for $(j_{src}^i, \alpha_i)$ in $M_{dst \to src}(j_{dst})$:
    $(\theta_i, \vec{\omega}_i) = \text{GetAnimPose}(j_{src}^i)$
    $R'_{src} = R'_{src} + (\alpha_i \theta_i)\vec{\omega}_i$
endfor
$R_{src} = \text{ExpMapToMatrix}(R'_{src})$
$R_{dst} = P_{bnd \to adjBnd}^{dst}(j_{dst}) Q_{rig \to jntLocal}(j_{dst}) R_{src} Q_{jntLocal \to rig}(j_{dst})$
SetPose($j_{dst}, R_{dst}$)
endfor GetAnimPose($j_{src}$) is a function that provides the joint-local rotation of a model representation joint $j_{src}$ in angle-axis form, where the axis of rotation is specified by a normalized 3D $\vec{\omega} \in \mathbb{R}^3$ and the amount of rotation is represented as an angle $\theta \in [-\pi, \pi]$.

$R'_{src} = R'_{src} + (\alpha_i \theta_i)\vec{\omega}_i$ represents the weighted (by weights $\alpha_i$) contributions of joint-local rotations to the rig-local transformation $R_{src}$ in the model representation (e.g., a SMPL representation) in rig space (e.g., rotations are expressed relative to the root of the articulated representation).

ExpMapToMatrix(R') that maps $R' \in \mathbb{R}^3 \to R \in \mathbb{R}^{3 \times 3}$ is a function that maps a rotation from exponential map form $\vec{\omega} \in \mathbb{R}^3$ into a rotation matrix. The exponential map form of a rotation is the unit length rotation axis multiplied by the rotation angle. In this form, it is easier to interpolate between rotations.

For the component:

$$R_{dst} P_{bnd \to adjBnd}^{dst}(j_{dst}) Q_{rig \to jntLocal}(j_{dst}) R_{src} Q_{jntLocal \to rig}(j_{dst})$$

the algorithm first maps from joint-local space to rig space using $Q_{jntLocal \to rig}(j_{dst})$, applies the transformation $R_{src}$ in rig-local space, maps back to joint-local space from rig space with $Q_{rig \to jntLocal}(j_{dst})$, then maps the destination rig into the adjusted bind pose using $P_{bnd \to adjBnd}^{dst}(j_{dst})$.

SetPose($j_{dst}, R_{dst}$) sets the joint-local pose of destination joint $j_{dst}$ to rotation $R_{dst}$.

The above algorithm may be implemented using any suitable alternate representation of rotation besides a matrix—e.g., quaternions—depending on whether the chosen representation better suits the implementation framework.

Notably, the above algorithm focuses only on applying a pose to the target articulated representation. Accordingly, returning briefly to FIG. 2, at 206, method 200 includes concurrently estimating, via a previously-trained pose optimization machine, a model pose of the model articulated representation and a target pose of the target articulated representation. The model pose and target pose are estimated based at least in part on the positioning data (e.g., collected as described above with respect to FIG. 3), and mapping constraints (e.g., as described above with respect to FIG. 4).

Figure 5A:
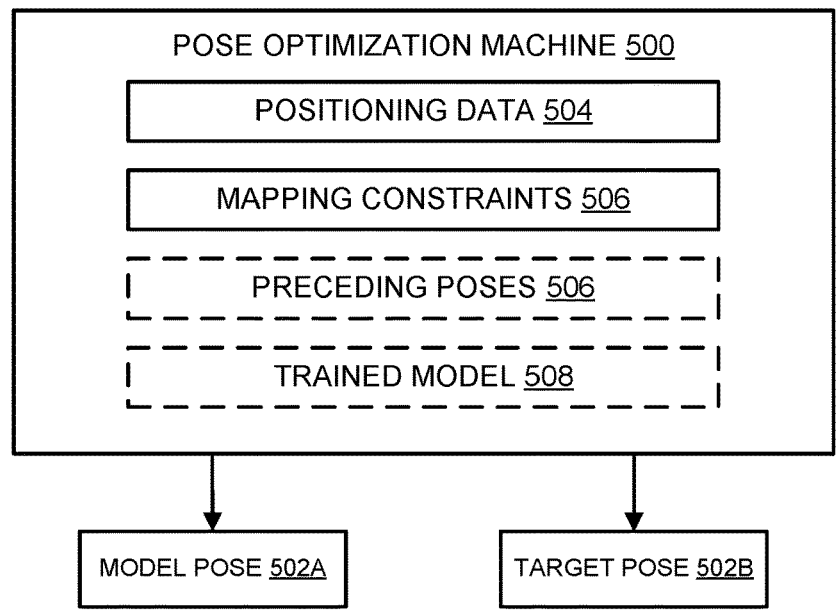
FIGS. 5A and 5B schematically illustrates a pose optimization machine concurrently estimating a model pose and a target pose.
Figure 5B:
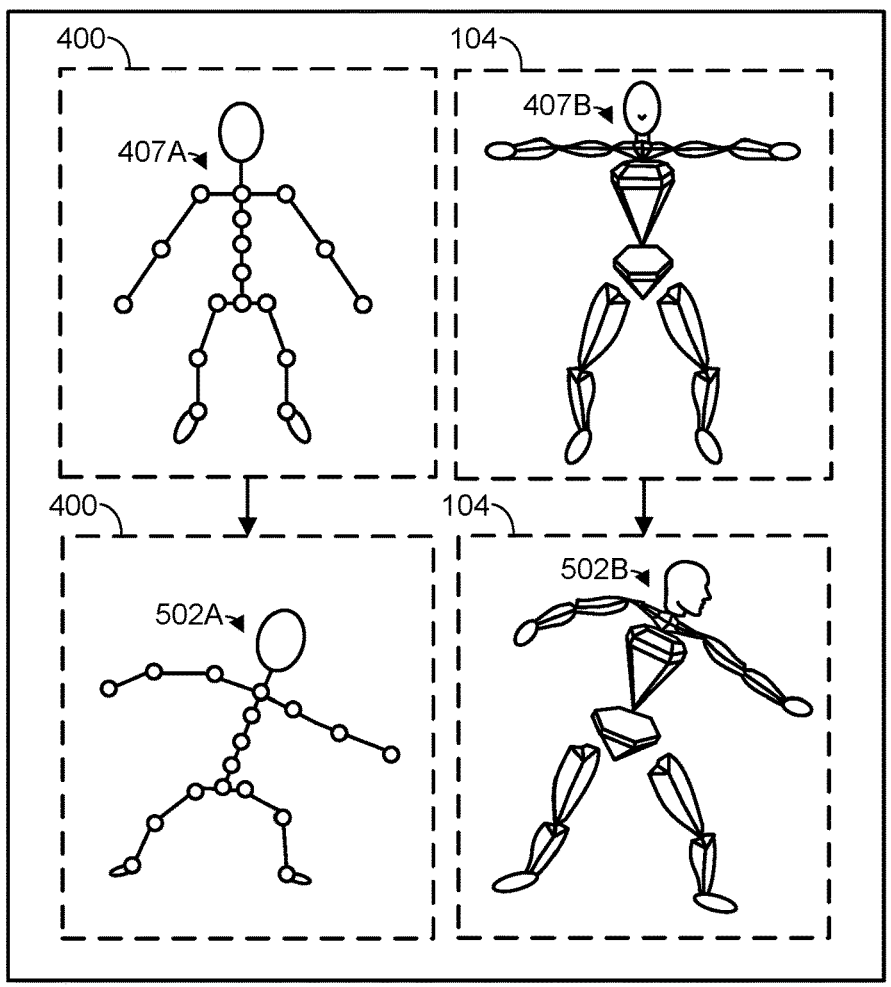

This is schematically illustrated with respect to FIGS. 5A and 5B. Specifically, FIG. 5A schematically shows an example pose optimization machine 500, which may be implemented as any suitable combination of computer logic components. As one non-limiting example, pose optimization machine 500 may be implemented as logic subsystem 602 described below with respect to FIG. 6.

As shown in FIG. 5A, the pose optimization machine concurrently estimates both a model pose 502A for a model articulated representation, and a target pose 502B for a target articulated representation. This is done based at least in part on positioning data 504 and one or more mapping constraints 506. Pose estimation may in some cases be done based at least in part on one or more preceding model poses and preceding target poses estimated on one or more preceding time frames. Thus, pose optimization machine 500 also stores a plurality of preceding poses 506, which may be expressed as a plurality of local rotations of each model's joints. As discussed above, the one or more mapping constraints may in some cases include a pose continuity constraint, which imposes a frame-to-frame limit restricting the extent to which the local rotation of a given joint can change from one frame to another.

FIG. 5B schematically illustrates applying the estimated model and target poses to the model and target articulated representations. Specifically, FIG. 5B again depicts model articulated representation 400 and target articulated representation 104 in their corresponding default poses 407A and 407B. The poses of the articulated reorientations are then changed, such that model articulated representation 400 assumes the model pose 502A and target articulated representation 104 assumes target pose 502B. Notably, each of these poses are similar to the real-world pose of human user 100 in FIG. 3.

It will be understood that the model pose and the target pose are estimated concurrently. In other words, in contrast to alternate approaches, the pose optimization machine does not first output a model pose for the model articulated representation, then transfer the pose to the target articulated representation. Rather, pose estimation may be described as concurrently finding two different poses for the two different representations that satisfy a set of constraints. For instance, the pose of the model articulated representation may be constrained by the prior training of the pose optimization machine to output likely human poses given an input set of positioning data, and the pose of the target articulated representation may be constrained by the one or more mapping constraints that relate the target articulated representation to the model articulated representation.

Furthermore, pose estimation may in some cases be performed by a previously-trained machine learning (ML) model 508 implemented by the pose optimization machine. As discussed above, the previously-trained pose optimization machine is trained with positioning data having ground truth labels for the model articulated representation. For example, the pose optimization machine may implement a neural network or other suitable model that is previously-trained by providing training positioning data specifying rotation parameters for joints of one or more training subjects, and the ground truth labels may specify a pose of the model articulated representation that would be consistent with the real-world pose of the training subject. More details regarding example machine learning (ML) and/or artificial intelligence (AI) techniques that may be useable to implement the techniques described herein are given below with respect to FIG. 6.

The pose optimization machine may in some cases be configured to output poses based on sparse input positioning data. In other words, the pose optimization machine may be trained to output pose estimates based on more input parameters than the pose optimization machine will typically receive at runtime. For example, the pose optimization machine may be trained to receive inputs corresponding to a user's head, arms, hands, torso, legs, feet, and/or other joints (or moveable body parts) of a training subject. As training progresses, one or more of these inputs may be selectively masked, to improve robustness of the model to cases where fewer inputs are provided. At runtime, the pose optimization machine may in some cases only receive input data corresponding to a user's head, and optionally one or both hands (e.g., when the hands happen to be visible in a camera FOV).

Put another way, the positioning data provided to the pose optimization machine may include rotation parameters for n joints of the human user, while the pose optimization machine was previously trained to receive rotation parameters for n+m joints as input, wherein m≥1. Estimating the model pose may then include estimating rotation parameters for n+m model joints of the model articulated representation, based at least on the rotation parameters for the n joints, and without rotation parameters for the m joints.

Furthermore, in some cases, the training positioning data for the pose optimization machine may not include ground truth labels for the target articulated representation. Rather, as discussed above, the target articulated representation is related to the model articulated representation via one or more mapping constraints, which will typically constrain the target pose to be substantially similar to the model pose. Due to the training positioning data having ground truth labels for the model articulated representation, the model pose output at runtime may be constrained to a relatively "likely" pose for the human user, which may be related to the target pose via one or more suitable constraints. This provides flexibility as to the types of target articulated representations that can be used, without compromising the fidelity of pose recreation. For example, the techniques described herein may beneficially enable a user to select their desired target representation from a wide range of options upon joining a virtual experience, or even change their target representation during a virtual session.

One example implementation is now described to illustrate various operations that may be performed by the pose optimization machine to concurrently estimate the model and target poses. Firstly, for optimizing rotations: given derivatives of $R_{src}$ on for the model articulated representation in axis-angle format, $R_{src(AA)}$, the derivatives of $R_{dst}$ in axis-angle format, $R_{dst(AA)}$ can be calculated via quaternions by applying the chain rule, to determine how $R_{dst(AA)}$ changes in response to the changes in $R_{src(AA)}$.

$$\frac{d(R_{dst(AA)})}{d(R_{src(AA)})} = \frac{d(R_{dst(AA)})}{d(R_{dst(Quat)})} \frac{d(R_{dst(Quat)})}{d(R_{src(Quat)})} \frac{d(R_{src(AA)})}{d(R_{src(Quat)})}$$

Translations may be transferred as-is, since they can be optimized later using inverse kinematics constraints. Root rotation and position may also be transferred as is from the model articulated representation to the target articulated representation.

Let $\theta_{dst}$ be the joint-local rotations corresponding to $R_{dst}$ and $\theta_{src}$ be the joint-local rotations corresponding to $R_{src}$. For each frame, given a set of input positioning data, the goal is to predict new model and target poses that are consistent with the positioning data and, where available, prior poses and positioning data. To this end, the pose optimization machine may implement the following process: (1) Compute local-to-world transforms for each bone/joint in the model representation's kinematic tree, given the root position and rotation of the model representation, and local rotations for joints of the model representation. (2) Calculate derivatives for target pose parameters with respect to source pose parameters (also referred to as "retargeting"). (3) Compute local-to-world transforms for the target articulated representation. (4) Optimize model and target pose parameters to minimize the error on the positions for one or more body parts of the target representation (e.g., head and hands). Step (4) may be done based at least in part on knowledge of one or prior model/target poses, and derivative transfer between the model and target articulated representations, while satisfying one or more continuity constraints (e.g., frame-to-frame pose continuity, gravity continuity, trajectory continuity).

The optimization may in some cases be performed by minimizing an energy for the model and target articulated representations simultaneously. As such, the model and target poses that are estimated by the pose optimization machine may be those that minimize the associated energy. For instance, the optimization may be done via a least-squares optimization method, as one non-limiting example.

For a specific implementation where the positioning data includes output for a position sensor that corresponds to a user's head, let L=Loss, λ=Weight associated with a loss term, $T^{Head}$=Predicted transform as an SE3 matrix for the head sensor, $\hat{T}^{Head}$=Input sensor measurement expressed as an SE3 transform for the head sensor, and $D_{SE3}[T_1, T_2]$=L2 Distance between two SE3 transforms $T_1$ and $T_2$.

$$\theta^* = \mathrm{argmin}_\theta \{\sum \lambda_i^2 L_i(\theta_{dst}) + \sum \lambda_k^2 L_{prior}(\theta_{src})\}$$

Here, the group of terms $L_i$ denote data terms defined on $\theta_{dst}$ that aim to minimize the distance between the observations from input sensors and the model prediction for the target articulated representation. The term $L_{prior}$ defined on $\theta_{src}$ is included as an example of a regularizer, which encodes prior knowledge of the distribution of plausible human poses.

The optimization problem can be rewritten as:

$$\theta^* = \mathrm{argmin}_\theta \{\sum \lambda_i^2 L_i(\rho(\theta_{src})) + \sum \lambda_k^2 L_{prior}(\theta_{src})\}$$

In this formulation, the function $\theta_{dst}=\rho(\theta_{src})$ denotes the retargeting mapping from the model articulated representation to the target articulated representation.

In this example, three data terms correspond to three position sensors for the user's head and two hands, and a regularizer is used to encode prior knowledge of plausible human poses:

$$\theta^* = \mathrm{argmin}_\theta \{\lambda_1^2 D_{SE3}[T^{Head}(\theta_{dst}), \hat{T}^{Head}] + \lambda_2^2 D_{SE3}[T^{LHand}(\theta_{dst}), \hat{T}^{LHand}] +$$
$$\lambda_3^2 D_{SE3}[T^{RHand}(\theta_{dst}), \hat{T}^{RHand}] + \lambda_4^2 L_{prior}(\theta_{src})\} =$$
$$\mathrm{argmin}_\theta \{\lambda_1^2 D_{SE3}[T^{Head}(\rho(\theta_{src})), \hat{T}^{Head}] + \lambda_2^2 D_{SE3}[T^{LHand}(\rho(\theta_{src})), \hat{T}^{LHand}] +$$
$$\lambda_3^2 D_{SE3}[T^{RHand}(\rho(\theta_{src})), \hat{T}^{RHand}] + \lambda_4^2 L_{prior}(\theta_{src})\}$$

In general, any suitable number of additional data terms (e.g., joint rotations), and/or additional regularizers (e.g., corresponding to gravity constraints, trajectory constraints, range-of-motion constraints), etc., may be added depending on the implementation.

The following is a non-limiting example implementation of retargeting pose derivatives via the chain rule:

$$\frac{d(R_{dst(AA)})}{d(R_{src(AA)})} = \frac{d(R_{dst(AA)})}{d(R_{dst(Quat)})} \frac{d(R_{dst(Quat)})}{d(R_{src(Quat)})} \frac{d(R_{src(AA)})}{d(R_{src(Quat)})}$$

This involves a triple matrix multiplication of dimension (3D×4D)×(4D×4S)×(4S×3S) for a target articulated representation consisting of D joints and a model articulated representation consisting of S joints. The matrices involved may in some cases be relatively sparse (e.g., a sparsity factor of ~2%), although the exact sparsity may depend on the joint mapping between the two articulated representations.

However, accounting for sparsity alone may in some cases not be sufficient for real-time implementations, as the process may not be sufficiently fast. Accordingly, the techniques described herein may efficiently be implemented by (1) exploiting the problem structure (e.g., the lower/upper triangular structure of the matrices), (2) optimizing compute scheduling via the observation that the matrices have a 3×4 or 4×3 or 4×4 block-sparse structure, which enables use of a specialized compressed storage for the block-sparse matrices, and (3), optimizing data access by way of specialized math functions to do block-local matrix multiplies. This further exploits the known problem structure and optimizes intermediate storage by anticipating future access patterns. For example, the result of (4D×4S)×(4S×3S) may be written row-wise but read column-wise.

With the above techniques, the speed of the process may beneficially be increased by two orders of magnitude. This can enable real-time concurrent estimation of model and target poses without requiring use of low-level native code or specialized hardware acceleration. However, it will be understood that the specific algorithms and computations described above are non-limiting examples. In other examples, the pose optimization machine may concurrently estimate the model and target poses in other suitable ways.

Returning briefly to FIG. 2, at 208, method 200 includes outputting the target articulated representation with the target pose as a virtual representation of the human user for display. For example, in FIG. 1, target articulated representation 104 is presented by electronic display device 108. As discussed with respect to FIG. 1, the display device that presents the target articulated representation may take any suitable form and may use any suitable underlying display technology. In some examples, the target articulated representation may be displayed by a near-eye display of an HMD—e.g., used by a different user also participating in the virtual experience.

In some cases, "outputting" the target articulated representation for display may include rendering the target articulated representation with the target pose as an image frame. The image frame may then be transmitted to a suitable display device—e.g., over a computer network such as the Internet. In other examples, the computing system need not render the target articulated representation as an image. Rather, upon estimating the target pose, parameters for the target pose (e.g., local rotations for joints of the target pose) may be transmitted to a separate computing device, which may be configured to apply the parameters to its own local instance of the target articulated representation, then render the target articulated representation for display.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 6:
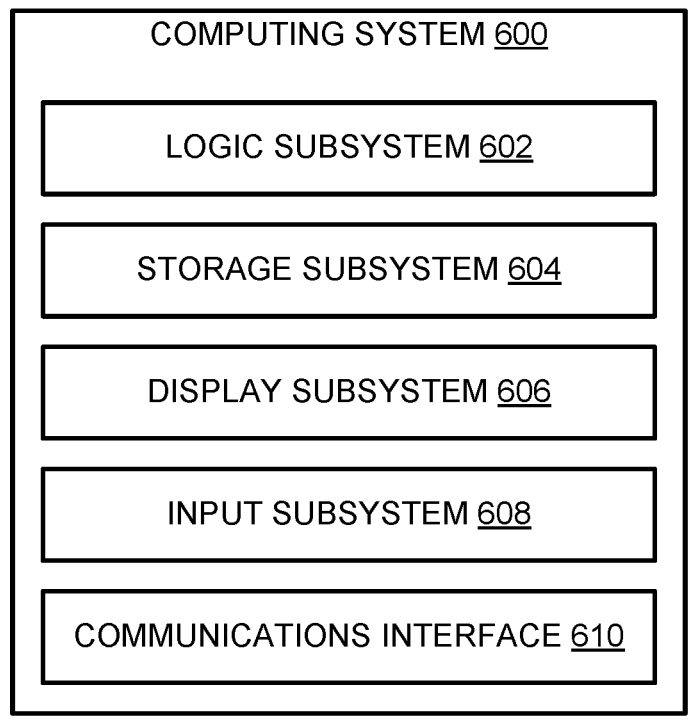
FIG. 6 schematically shows an example computing system.

FIG. 6 schematically shows a simplified representation of a computing system 600 configured to provide any to all of the compute functionality described herein. Computing system 600 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 600 includes a logic subsystem 602 and a storage subsystem 604. Computing system 600 may optionally include a display subsystem 606, input subsystem 608, communication subsystem 610, and/or other subsystems not shown in FIG. 6.

Logic subsystem 602 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 604 includes one or more physical devices configured to temporarily and/or permanently hold computer information such as data and instructions executable by the logic subsystem. When the storage subsystem includes two or more devices, the devices may be collocated and/or remotely located. Storage subsystem 604 may include volatile, nonvolatile, dynamic, static, read/write, read-only, random-access, sequential-access, location-addressable, file-addressable, and/or content-addressable devices. Storage subsystem 604 may include removable and/or built-in devices. When the logic subsystem executes instructions, the state of storage subsystem 604 may be transformed — e.g., to hold different data.

Aspects of logic subsystem 602 and storage subsystem 604 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

Machines may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

When included, display subsystem 606 may be used to present a visual representation of data held by storage subsystem 604. This visual representation may take the form of a graphical user interface (GUI). Display subsystem 606 may include one or more display devices utilizing virtually any type of technology. In some implementations, display subsystem may include one or more virtual-, augmented-, or mixed reality displays.

When included, input subsystem 608 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 610 may be configured to communicatively couple computing system 600 with one or more other computing devices. Communication subsystem 610 may include wired and/or wireless communication devices compatible with one or more different communication protocols. The communication subsystem may be configured for communication via personal-, local- and/or wide-area networks.

The methods and processes disclosed herein may be configured to give users and/or any other humans control over any private and/or potentially sensitive data. Whenever data is stored, accessed, and/or processed, the data may be handled in accordance with privacy and/or security standards. When user data is collected, users or other stakeholders may designate how the data is to be used and/or stored. Whenever user data is collected for any purpose, the user data may only be collected with the utmost respect for user privacy (e.g., user data may be collected only when the user owning the data provides affirmative consent, and/or the user owning the data may be notified whenever the user data is collected). If the data is to be released for access by anyone other than the user or used for any decision-making process, the user's consent may be collected before using and/or releasing the data. Users may opt-in and/or opt-out of data collection at any time. After data has been collected, users may issue a command to delete the data, and/or restrict access to the data. All potentially sensitive data optionally may be encrypted and/or, when feasible, anonymized, to further protect user privacy. Users may designate portions of data, metadata, or statistics/results of processing data for release to other parties, e.g., for further processing. Data that is private and/or confidential may be kept completely private, e.g., only decrypted temporarily for processing, or only decrypted for processing on a user device and otherwise stored in encrypted form. Users may hold and control encryption keys for the encrypted data. Alternately or additionally, users may designate a trusted third party to hold and control encryption keys for the encrypted data, e.g., so as to provide access to the data to the user according to a suitable authentication protocol.

When the methods and processes described herein incorporate ML and/or AI components, the ML and/or AI components may make decisions based at least partially on training of the components with regard to training data. Accordingly, the ML and/or AI components may be trained on diverse, representative datasets that include sufficient relevant data for diverse users and/or populations of users. In particular, training data sets may be inclusive with regard to different human individuals and groups, so that as ML and/or AI components are trained, their performance is improved with regard to the user experience of the users and/or populations of users.

ML and/or AI components may additionally be trained to make decisions so as to minimize potential bias towards human individuals and/or groups. For example, when AI systems are used to assess any qualitative and/or quantitative information about human individuals or groups, they may be trained so as to be invariant to differences between the individuals or groups that are not intended to be measured by the qualitative and/or quantitative assessment, e.g., so that any decisions are not influenced in an unintended fashion by differences among individuals and groups.

ML and/or AI components may be designed to provide context as to how they operate, so that implementers of ML and/or AI systems can be accountable for decisions/assessments made by the systems. For example, ML and/or AI systems may be configured for replicable behavior, e.g., when they make pseudo-random decisions, random seeds may be used and recorded to enable replicating the decisions later. As another example, data used for training and/or testing ML and/or AI systems may be curated and maintained to facilitate future investigation of the behavior of the ML and/or AI systems with regard to the data. Furthermore, ML and/or AI systems may be continually monitored to identify potential bias, errors, and/or unintended outcomes.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a method for virtually representing human body poses comprises: receiving positioning data detailing parameters for one or more body parts of a human user based at least in part on input from one or more sensors; maintaining one or more mapping constraints relating a model articulated representation to a target articulated representation; concurrently estimating, via a previously-trained pose optimization machine, a model pose of the model articulated representation and a target pose of the target articulated representation based at least in part on the positioning data and the one or more mapping constraints, wherein the previously-trained pose optimization machine is trained with training positioning data having ground truth labels for the model articulated representation; and outputting the target articulated representation with the target pose as a virtual representation of the human user for display. In this example or any other example, the training positioning data does not have ground truth labels for the target articulated representation. In this example or any other example, the one or more mapping constraints include a joint mapping constraint specifying, for a joint of the target articulated representation, a set of one or more joints in the model articulated representation. In this example or any other example, the joint mapping constraint further specifies weights for each of the one or more joints in the model articulated representation that map to the joint of the target articulated representation. In this example or any other example, the one or more mapping constraints include a root-relative correspondence constraint, specifying that a rotation of a model joint of the model articulated representation relative to a root of the model articulated representation in the model pose has at least a threshold similarity to a rotation of one or more corresponding target joints of the target articulated representation relative to a root of the target articulated representation in the target pose. In this example or any other example, the one or more mapping constraints include a default pose transformation constraint, specifying one or more rotations to be applied to one or more joints of the target articulated representation to match a default pose of the model articulated representation. In this example or any other example, the model pose and the target pose are further estimated based at least in part on one or more preceding model poses and preceding target poses estimated on one or more preceding time frames. In this example or any other example, the one or more mapping constraints include a pose continuity constraint, specifying a frame-to-frame change limit for one or more joints of the model articulated representation and one or more joints of the target articulated representation. In this example or any other example, the model articulated representation includes a different number of joints from the target articulated representation. In this example or any other example, the positioning data is sparse positioning data that includes rotation parameters for n joints of the human user; the pose optimization machine is previously trained to receive as input rotation parameters for n+m joints, wherein m≥1, and estimating the model pose includes estimating rotation parameters for n+m model joints of the model articulated representation, based at least on the rotation parameters for the n joints without rotation parameters for the m joints. In this example or any other example, the one or more body parts of the human user include a head of the human user. In this example or any other example, the one or more body parts of the human user further include one or both hands of the human user. In this example or any other example, the one or more sensors include a camera configured to image at least one body part of the human user. In this example or any other example, the one or more sensors include one or more position sensors configured to be held by or worn by at least one body part of the human user.

In an example, a computing system comprises: a logic subsystem; and a storage subsystem holding instructions executable by the logic subsystem to: receive positioning data detailing parameters for one or more body parts of a human user based at least in part on input from one or more sensors; maintain one or more mapping constraints relating a model articulated representation to a target articulated representation; concurrently estimate, via a previously-trained pose optimization machine, a model pose of the model articulated representation and a target pose of the target articulated representation based at least in part on the positioning data and the one or more mapping constraints, wherein the previously-trained pose optimization machine is trained with training positioning data having ground truth labels for the model articulated representation; and output the target articulated representation with the target pose as a virtual representation of the human user for display. In this example or any other example, the training positioning data does not have ground truth labels for the target articulated representation. In this example or any other example, the one or more mapping constraints include a joint mapping constraint specifying, for a joint of the target articulated representation, a set of one or more joints in the model articulated representation. In this example or any other example, the model articulated representation includes a different number of joints from the target articulated representation. In this example or any other example, the positioning data is sparse positioning data that includes rotation parameters for n joints of the human user; the pose optimization machine is previously trained to receive as input rotation parameters for n+m joints, wherein m≥1, and estimating the model pose includes estimating rotation parameters for n+m model joints of the model articulated representation, based at least on the rotation parameters for the n joints without rotation parameters for the m joints.

In an example, a method for virtually representing human body poses comprises: receiving sparse positioning data detailing parameters for a head and one or both hands of a human user based at least in part on input from one or more sensors; maintaining one or more mapping constraints relating a model articulated representation to a target articulated representation, the model articulated representation having a different number of joints from the target articulated representation; concurrently estimating, via a previously-trained pose optimization machine, a model pose of the model articulated representation and a target pose of the target articulated representation based at least in part on the sparse positioning data and the one or more mapping constraints, wherein the previously-trained pose optimization machine is trained with training positioning data having ground truth labels for the model articulated representation; and outputting the target articulated representation with the target pose as a virtual representation of the human user for display.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for virtually representing human body poses, the method comprising:
receiving positioning data detailing parameters for one or more body parts of a human user based at least in part on input from one or more sensors;
maintaining one or more mapping constraints relating a model articulated representation to a target articulated representation, wherein the model articulated representation includes a different number of joints from the target articulated representation;
concurrently estimating, via a previously-trained pose optimization machine, a model pose of the model articulated representation and a target pose of the target articulated representation based at least in part on the positioning data and the one or more mapping constraints, wherein the previously-trained pose optimization machine is trained with training positioning data having ground truth labels for the model articulated representation; and outputting the target articulated representation with the target pose as a virtual representation of the human user for display.

2. The method of claim 1, wherein the training positioning data does not have ground truth labels for the target articulated representation.

3. The method of claim 1, wherein the one or more mapping constraints include a joint mapping constraint specifying, for a joint of the target articulated representation, a set of one or more joints in the model articulated representation.

4. The method of claim 3, wherein the joint mapping constraint further specifies weights for each of the one or more joints in the model articulated representation that map to the joint of the target articulated representation.

5. The method of claim 1, wherein the one or more mapping constraints include a root-relative correspondence constraint, specifying that a rotation of a model joint of the model articulated representation relative to a root of the model articulated representation in the model pose has at least a threshold similarity to a rotation of one or more corresponding target joints of the target articulated representation relative to a root of the target articulated representation in the target pose.

6. The method of claim 1, wherein the one or more mapping constraints include a default pose transformation constraint, specifying one or more rotations to be applied to one or more joints of the target articulated representation to match a default pose of the model articulated representation.

7. The method of claim 1, wherein the model pose and the target pose are further estimated based at least in part on one or more preceding model poses and preceding target poses estimated on one or more preceding time frames.

8. The method of claim 7, wherein the one or more mapping constraints include a pose continuity constraint, specifying a frame-to-frame change limit for one or more joints of the model articulated representation and one or more joints of the target articulated representation.

9. The method of claim 1, wherein the positioning data is sparse positioning data that includes rotation parameters for n joints of the human user; the pose optimization machine is previously trained to receive as input rotation parameters for n+m joints, wherein m≥1, and estimating the model pose includes estimating rotation parameters for n+m model joints of the model articulated representation, based at least on the rotation parameters for the n joints without rotation parameters for the m joints.

10. The method of claim 1, wherein the one or more body parts of the human user include a head of the human user.

11. The method of claim 10, wherein the one or more body parts of the human user further include one or both hands of the human user.

12. The method of claim 1, wherein the one or more sensors include a camera configured to image at least one body part of the human user.

13. The method of claim 1, wherein the one or more sensors include one or more position sensors configured to be held by or worn by at least one body part of the human user.

14. A computing system, comprising:
a logic subsystem; and
a storage subsystem holding instructions executable by the logic subsystem to:
receive positioning data detailing parameters for one or more body parts of a human user based at least in part on input from one or more sensors;
maintain one or more mapping constraints relating a model articulated representation to a target articulated representation, wherein the model articulated representation includes a different number of joints from the target articulated representation;
concurrently estimate, via a previously-trained pose optimization machine, a model pose of the model articulated representation and a target pose of the target articulated representation based at least in part on the positioning data and the one or more mapping constraints, wherein the previously-trained pose optimization machine is trained with training positioning data having ground truth labels for the model articulated representation; and
output the target articulated representation with the target pose as a virtual representation of the human user for display.

15. The computing system of claim 14, wherein the training positioning data does not have ground truth labels for the target articulated representation.

16. The computing system of claim 14, wherein the one or more mapping constraints include a joint mapping constraint specifying, for a joint of the target articulated representation, a set of one or more joints in the model articulated representation.

17. The computing system of claim 14, wherein the positioning data is sparse positioning data that includes rotation parameters for n joints of the human user; the pose optimization machine is previously trained to receive as input rotation parameters for n+m joints, wherein m≥1, and estimating the model pose includes estimating rotation parameters for n+m model joints of the model articulated representation, based at least on the rotation parameters for the n joints without rotation parameters for the m joints.

18. A method for virtually representing human body poses, the method comprising:
receiving sparse positioning data detailing parameters for a head and one or both hands of a human user based at least in part on input from one or more sensors;
maintaining one or more mapping constraints relating a model articulated representation to a target articulated representation, the model articulated representation having a different number of joints from the target articulated representation;
concurrently estimating, via a previously-trained pose optimization machine, a model pose of the model articulated representation and a target pose of the target articulated representation based at least in part on the sparse positioning data and the one or more mapping constraints, wherein the previously-trained pose optimization machine is trained with training positioning data having ground truth labels for the model articulated representation; and
outputting the target articulated representation with the target pose as a virtual representation of the human user for display.

* * * * *